Dec. 23, 1958     O. E. DWYER     2,865,827
POWER GENERATION FROM LIQUID METAL NUCLEAR FUEL
Filed May 27, 1955
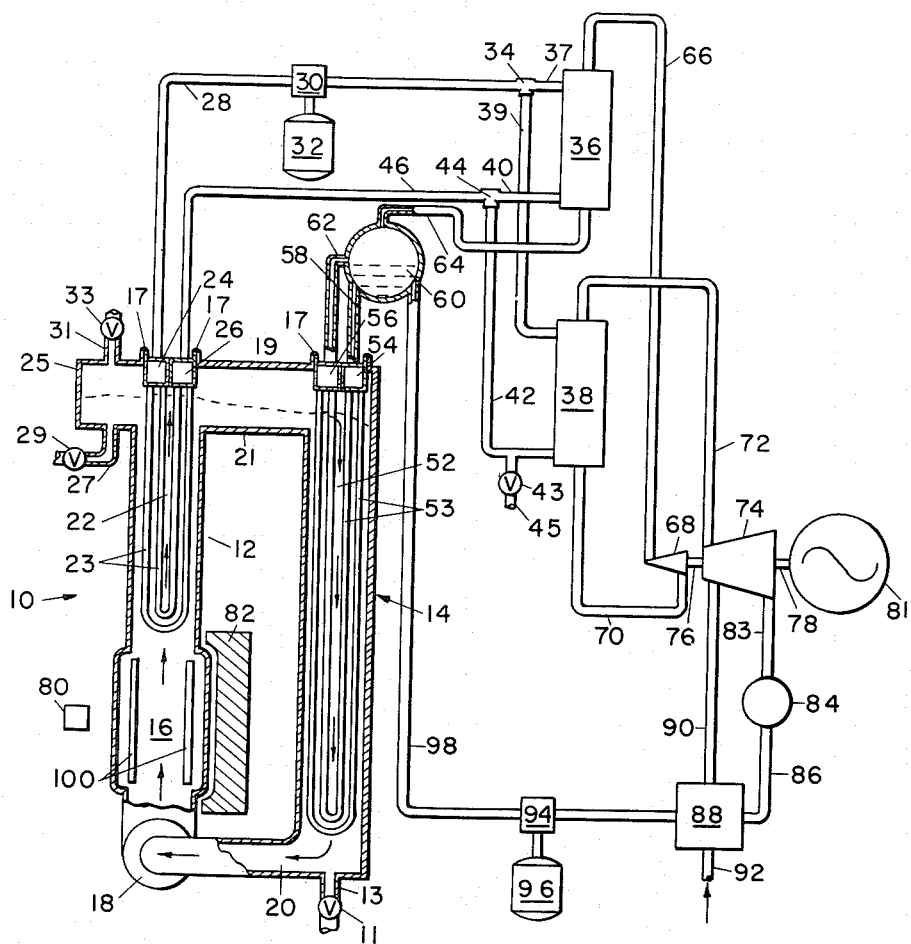
INVENTOR.
ORRINGTON E. DWYER
BY

United States Patent Office 2,865,827
Patented Dec. 23, 1958

2,865,827

POWER GENERATION FROM LIQUID METAL NUCLEAR FUEL

Orrington E. Dwyer, Wading River, N. Y., assignor to the United States of America as represented by the United States Atomic Energy Commission Application May 27, 1955, Serial No. 511,805

2 Claims. (Cl. 204—193.2)

The present invention relates to apparatus useful in producing steam.

In order to derive useful power from nuclear fuels such as uranium, it is necessary to transfer heat produced by the fissioning of the fuels to an apparatus capable of converting the heat into other useful forms of energy. Steam is the medium which is usually employed in converting heat energy to electricity through a turbine generator unit.

When the heat which is to be converted to steam is produced in a liquid metal fuel reactor, a relatively new problem in heat transfer exists because of the novelty of the liquid metal fuel reactor itself. Such a reactor is one in which the fissile material is dissolved or finely dispersed in a liquid metal or a liquid mixture of two or more metals. One metal which has been found to have a combination of desirable properties as a solvent or dispersion medium for the fuel in such reactors is bismuth. The dissolved or dispersed fissile material may be either uranium 233, uranium 235, plutonium 239 or any mixture of these. Such a liquid composition is extremely expensive and it is desirable to minimize the quantity which must be employed to operate a reactor or obtain a high temperature in the liquid medium as a result of nuclear reactions. A further reason for minimizing the use of bismuth in the reactors is that its availability is, and production potential seems to be, limited. It is accordingly one of the objects of the present invention to provide apparatus for the very efficient removal of heat generated in a liquid metal nuclear fuel. Another object is to provide apparatus for removing heat from an expensive liquid which minimizes the quantity of this liquid which must be used. Other objects will be in part apparent and in part pointed out hereinafter.

Nuclear reactors which employ solid fuel elements must be cooled internally, that is, by a coolant flowing through the core of the reactor. The present invention takes advantage of the fluid form of the fuel to provide external cooling. According to this scheme, the liquid fuel is continuously circulated in closed circuits consisting of the reactor core and external heat exchangers.

In one of its broder aspects, the objects of the present invention are achieved by providing a first closed circulation path for circulating a liquid metal through a region of heat generation, a region of high temperature heat removal and a region of low temperature heat removal, providing a second closed circulation path for circulating a heat transfer medium, circulating this medium in said second path in heat transfer proximity through said high temperature region, a superheater region and a reheater region, providing a third closed circulation path for circulating steam and water, circulating water in said third path to pass it first in heat transfer proximity through said low temperature region to generate steam, passing the steam so generated in heat transfer proximity through said superheater region, passing the resulting superheated steam into power yielding contact with a high pressure turbine to form lower temperature exit steam, passing the exit steam into heat exchange proximity with said heat transfer medium in said reheater region, passing said reheated steam into power yielding contact with a low pressure turbine, condensing the exit steam from said low pressure turbine and returning the resulting water through regenerative heaters to heat transfer proximity with said low temperature region.

One apparatus which is particularly well suited for carrying out the present invention is illustrated in the attached drawing which is a schematic illustration, partly in section, of the various heat transfer and power generation components and the interconnections therebetween.

Referring to this drawing, a metal container 10 suitable for the circulation of liquid bismuth metal therein is provided in the form of a loop. The loop has three regions 12, 14 and 16 concerned with the heating and cooling of bismuth and a pump 18 for circulating the bismuth. The two regions 12 and 14 are provided with heat exchange apparatus 22 and 52 respectively, for the removal of high temperature energy acquired by the bismuth as heat in region 16. In order to generate the high temperature energy in the bismuth passing through region 16, a nuclear fuel such as uranium is incorporated in the bismuth and the composition is subjected to neutron irradiation. These neutrons can be produced internally in the region by a neutron source such as a polonium-beryllium soruce or a radium-beryllium source or by a self-sustained nuclear chain reaction of the nuclear fuel present in the region.

Neutrons can be derived equally well from an external neutron source such as an independent self-sustaining reactor. One such reactor is described in the U. S. Patent of Fermi and Szilard, No. 2,708,656, issued May 17, 1955. The region 16 of the loop may be placed close to the independent reactor to receive neutrons therefrom or the loop 10 may be of such form as to permit portion 16 to be inserted directly into the reactor. As illustrated, the neutron source can be positioned external to but adjacent the region 16 in which the heat is to be generated. A blanket 82 is also shown as positioned adjacent the region 16 on the side opposite the neutron source and in a position to receive excess neutrons passing through the region from source 80 or originating in region 16.

Whatever may be the source of neutrons, one of the effects of the irradiation of liquid metal fuel in the region 16 is the heating of the metal therein. The heated liquid is circulated by means of pump 18 located in the low temperature leg 20 of the loop. A booster pump, not shown, may be located in the high temperature region 12. Natural convection of the liquid metal in the loop assists circulation of the bismuth through the loop.

The heated metal passes first to the high temperature heat removal region 12. A heat exchanger 22 is located in this region to permit passage of an intermediate heat transfer medium into thermal contact with the heated liquid fuel passing therethrough. Such an exchanger may have the form of a bundle of hairpin heat exchange tubes 23 having their bent ends immersed in the liquid fuel and having the open ends manifolded to the twin outlet and inlet manifolds 24 and 26 respectively. A conduit 28 attached to manifold 24 provides a flow path for removal of the intermediate heat transfer medium passing from the heat exchanger 22. The flow of the medium is the result of the action of the pump 30 driven by motor 32. The flow path is divided at a T-connection 34. Two separate streams are formed at this point to supply the medium in parallel flow to the two heat exchanges 36 and 38 through conduits 37 and 39 respectively. Exchanger 36 is a superheater and 38 is a reheater. Return of the medium from these exchangers is through the conduits 40, 42, the T-connection 44 and the conduit 46 to the inlet manifold 26 for exchanger 22.

From the foregoing, it is apparent that heat exchangers 22, 36 and 38 and the interconnection piping form a closed circulation path for circulating an intermediate heat transfer medium to transfer heat from a primary liquid passing through the high temperature region 12 to a tertiary fluid flowing through the heat exchangers 36 and 38.

Returning now to the loop 10, a heat exchanger or boiler 52 is provided for the removal of heat from the low temperature region 14. This exchanger may have a form similar to that provided in region 12 and may thus consist of a bundle of hairpin tubes 53 with their bent ends immersed in the liquid metal fuel flowing through region 14. The open ends of the tubes extend upward and are manifolded to the supply and collection manifolds 54 and 56. Water is supplied to the exchanger from a steam drum 60 through a conduit 58 attached between the lower portion of drum 60 and the inlet manifold 54. A pump, not shown, may be provided in conduit 58 to force water into the boiler 52. The water passes through the loops 53 of boiler 52 and is converted to steam. Steam and water emerge from the loops 53 through manifold 56 and pass to steam drum 60 through conduit 62. Saturated steam passes from the drum 60 through the conduit 64 to enter the heat exchanger 36. The steam is converted to superheated steam in passing through the exchanger 36, in thermal contact with the intermediate heat exchange medium passing countercurrently therethrough. The product steam is conveyed through the pipe 66 to the high temperature portion 68 of a steam turbine.

The steam, exit from the high temperature end of the turbine, passes through the conduit 70 to reheater 38. In this unit, it is reheated by thermal contact with the intermediate heat transfer medium passing countercurrently therethrough. The reheated steam is carried through the conduit 72 to the low temperature portion 74 of the steam turbine. The action of the steam on this turbine is transmitted through the shafts 76 and 78 to the generator 81. The steam exit from turbine 74 passes through a conduit 83 to a condenser 84. The condensate passes through the conduit 86 to the feedwater heater 88. A portion of the steam, exit from turbine 74, is passed through the conduit 90 to the feedwater heater to heat water entering through conduit 92 from an external source not shown and condensate entering through conduit 86. The heated water is pumped by means of pump 94 driven by motor 96 through the conduit 98 to the vapor trap.

The apparatus through which the steam passes comprises a third closed flow path for circulating steam and water. Circulation of water through this path makes possible the removal of a portion of the heat from the liquid metal fuel as it passes through region 14 by the conversion of water to steam and also makes possible the superheating and reheating of the steam produced to render it suitable for conversion to electrical power in the steam turbine and generator apparatus.

One of the particular advantages of the above described apparatus for removing heat from an expensive liquid metal is that it minimizes the "hold up" or amount of this liquid which must be contained in the apparatus in order to effect the necessary heat transfer. The advantage is gained because the present scheme brings only liquids having high heat transfer coefficients into contact with the expensive liquid metals. Transfer of heat to superheated steam is carried out in the external heat exchangers 36 and 38, the use of which does not increase the quantity of expensive liquid metals needed. It is apparent that the foregoing description and drawing illustrate a number of heat transfer features of the subject invention. Numerous modifications, additions and substitutions can be made in the apparatus and components thereof without departing from the scope of the invention. For example, means for introducing and removing the liquid metal ingredients to and from the loop 10 and to and from the intermediate heat transfer flow path can be added. The valve 11 and conduit 13 provide such means at the bottom of loop 10. The valve 43 and conduit 45 provide corresponding means in the intermediate heat transfer flow path. More complex regenerative feed heaters of conventional design employing a plurality of steam bleed-offs from the turbine such as 90 shown may also be employed to achieve higher thermal efficiency.

Means for removing gaseous fission products from the loop may also be provided at the upper end of the loop. Such an apparatus includes, for example, a sparging arm 25 similar in shape to the conduit 21 but extending in the opposite direction from the top of region 12 of the loop. The arm is provided with a gas inlet tube 27, a valve 29, and a gas outlet tube 31 having a valve 33. The valves, tubes and sparging arm constitute a path for introduction and removal of the sparging gas and for the removal of fission products from the liquid metal in the loop. The sparging operation is carried out by passing an inert gas such as helium through the liquid metal in the sparging arm of the loop and removing it together with the volatile fission products.

Another feature which may be incorporated in the apparatus concerns the heat exchange components maintained in contact with the liquid bismuth. As seen in the figure these exchangers are made up of a number of hairpin tubes sealed to the manifolds connected to the upper wall of the loop 10. As shown, an upper projection extending from the outer walls of the twin manifolds is sealed to a conforming upper projection from the top wall 19 of the loop 10 by the welds 17. The heat exchanger unit including the twin manifolds and attached bundle of hairpin tubes may be removed by cutting the welds 17 and withdrawing the heat exchangers as a unit. Protective inert gas atmospheres may be employed to protect the metal from the atmosphere during such operation.

Another advantage of this mode of construction is that the welds attaching the individual tubes to the manifolds remain above the surface of the liquid bismuth in the loop 10. This avoids any attack by the bismuth of the welds or the portions of the apparatus heated during welding.

The exclusive use of U-shaped tubes of the unit minimizes thermal stresses and results in a double pass, or double contact, of the heat exchange medium in the tubes with the liquid in which the tube is immersed. This mode of construction also reduces the likelihood of plugging due to solution or erosion by bismuth of the container metal from the high temperature portions of the apparatus and its deposit in the exchangers or low temperature portions of the apparatus. The likelihood of such plugging is reduced because the bismuth does not flow through the narrower inner passages of the tubes. Pressure drops through the exchanger on the fuel side are likewise minimized by having the fuel flow for the most part parallel to the tubes.

The following have been found to be desirable values of operating conditions and component dimensions when the apparatus is used in connection with a self-sustained chain reaction in region 16. When used in this manner bismuth having a uranium 233 or uranium 235 concentration of about 600 to 1000 parts per million is flowed upward through the region 16 and a bundle of vertical beryllium rods 100 are included as moderators for the neutrons produced in the region. Other moderators such as graphite may be employed in suitable configuration. Internal or external auxiliary neutron sources such as uranium-beryllium or plutonium-beryllium sources may be employed. When such a reactor is in operation, the liquid metal fuel rises through region 16, is heated therein and leaves at a temperature of about 520° C. The bismuth passes through the region 12 and is cooled to about 473° C. to remove approximately 82 megawatts of heat as it flows in contact with the heat exchanger 22. Such an exchanger may have the following specifications: Using tubes having inside diameters of from 0.600 to 0.700 inch and wall thickness of about ⅛ inch, and an intertubular spacing of about ¼ inch, from 1120 to 1257 of the tubes are enclosed in a space 3.4 to 3.5 feet in diameter and 10.4 to 10.6 feet high. A maximum temperature drop of approximately 121 to 125° F. occurs across the tube wall. About 66 to 68 percent of the total resistance to heat transfer in the exchanger is due to the tube walls. A bismuth velocity of 10.0 feet per second and a sodium velocity of 11.6 feet per second, where this is used as an intermediate heat exchange medium, are employed. The exchanger requires the relatively small sodium holdup of 1370 to 1760 pounds and a bismuth holdup of 13.5 to 14.6 tons. The sodium enters this exchanger at a temperature of about 700° F. and leaves at a temperature of about 870° F. The 0.600 to 0.700 inch internal diameter for heat exchange tubes has been found to be an optimum. This is because the larger tubes cannot be held down to an intertubular spacing of ¼ inch and tubes smaller than 0.600 inch must be used in excessive numbers.

The liquid bismuth and fuel next pass to two boilers, only one of which is shown, where the temperature is lowered from 473° C. to about 350° C. to transfer approximately 218 megawatts of heat energy to the water. An exchanger suitable for this purpose has a diameter of about 2.6 feet and a height of about 18 feet. Tubes of between 0.600 and 0.700 inch internal diameter have also been found optimum for the exchange of heat between bismuth and water. Approximately 620 to 740 such tubes are contained in the region 14. Bismuth is pumped through the region at a velocity of between 8.5 and 9.0 feet per second requiring a bismuth holdup of between 12.8 and 13.1 tons.

From the foregoing, it will be noted that, to transfer approximately 300 megawatts, a total bismuth holdup of approximately 40 tons is required. From the boiler the liquid bismuth is returned through the pump 18 to the reactor core 16 where its temperature is again raised to approximately 520° C. From the foregoing, it is evident that the removal of megawatt quantities of heat may be accomplished by removal of approximately 73% by direct transfer to boiling water and the remainder to liquid sodium. The fraction of the total energy which is used for reheating and superheating depends on the temperatures and pressures of the steam cycle and generally increases with increasing temperatures and pressures. For the fraction given above a steam temperature of 880 to 900° F. at the outlet of the superheater and a steam temperature of 550° F. at the boiler are contemplated.

It is preferred to have the exchangers 12 and 14 in a length ratio such that the boiler portion has approximately the same length as the combined heater and intermediate heat transfer portions to minimize the holdup.

Since many embodiments might be made in the present invention and since many changes might be made in the embodiment described, it is to be understood that the foregoing description is to be interpreted as illustrative only and not in a limiting sense.

I claim:
1. Apparatus for generating power from heat produced by the fissioning of uranium dissolved in liquid bismuth which comprises a loop for the circulation of said bismuth, a source of neutrons for irradiating said uranium-containing bismuth in a first section of said loop, a first heat exchanger in said loop downstream from said first section, a superheater and a reheater and means for circulating a liquid metal heat exchange medium from said first heat exchanger in parallel flow to said superheater and reheater, a second heat exchanger in said loop downstream from said first heat exchanger and having a length approximately equal to the combined lengths of the first heat exchanger and the first section of said loop, a steam turbine and a source of water, flow means connecting said source of water to said second heat exchanger to supply water to said second heat exchanger, flow means connecting said second heat exchanger to said superheater to supply steam to said superheater, flow means connecting said superheater to said turbine to supply superheated steam to said turbine, flow means connecting said turbine to said reheater to supply steam to said reheater, flow means connecting said reheater to said turbine to supply reheated steam to said turbine, and means for returning the steam from said turbine to said second heat exchanger in condensed form.

2. Apparatus for generating power from heat produced by the fissioning of uranium dissolved in liquid bismuth which comprises a closed loop for the circulation of said bismuth, a source of neutrons for irradiating said uranium-containing bismuth in a first section of said loop, a first heat exchanger in a second section of said loop downstream from said first section, means comprising the superheater of said apparatus, a reheater, means for circulating a liquid metal heat exchange medium from said first heat exchanger in parallel flow through said superheater means and reheater and back to said first heat exchanger, a second heat exchanger in a third section of said loop downstream from said first heat exchanger, means for circulating through said second heat exchanger and said superheater means in succession a power generating fluid for being heated to a superheated temperature and pressure thereby, means including motor means for expanding said power generating fluid, means for reheating said fluid in said reheater before completing expansion in said motor means, and means for condensing said fluid after expansion thereof and returning same under pressure to said second heat exchanger for heating again.

References Cited in the file of this patent
UNITED STATES PATENTS

| | | |
|---|---|---|
| 1,768,058 | Hartmann | June 24, 1930 |
| 1,882,750 | Black | Oct. 13, 1932 |
| 1,889,586 | Grebe | Nov. 29, 1932 |
| 2,579,027 | Walter et al. | Dec. 18, 1951 |
| 2,758,023 | Bareis | Aug. 7, 1956 |

OTHER REFERENCES

U. S. Atomic Energy Comm. BNL–178, June 1952, "A Survey of Three Heat Exchanges for a Liquid Metal Fuel Reactor," pp. 7–9.

Nucleonics, July 1954, pp. 11–13.

Chemical Eng. Progress Symposium Series, No. 11 (1954), vol. 50, pp. 75, 78, 79, 80, 81, 83, 245–248.

Nuclear Eng., Part I, publ. by Amer. Institute of Chem. Eng.